United States Patent
Voitsechov et al.

(10) Patent No.: US 11,354,157 B2
(45) Date of Patent: Jun. 7, 2022

(54) HANDLING MULTIPLE GRAPHS, CONTEXTS AND PROGRAMS IN A COARSE-GRAIN RECONFIGURABLE ARRAY PROCESSOR

(71) Applicant: SPEEDATA LTD., Even Yehuda (IL)

(72) Inventors: Dani Voitsechov, Atlit (IL); Yoav Etsion, Atlit (IL)

(73) Assignee: SPEEDATA LTD., Haifa (IL)

( * ) Notice: Subject to any disclaimer, the term of this patent is extended or adjusted under 35 U.S.C. 154(b) by 93 days.

(21) Appl. No.: 16/860,070

(22) Filed: Apr. 28, 2020

(65) Prior Publication Data
US 2021/0334134 A1 Oct. 28, 2021

(51) Int. Cl.
G06F 9/48 (2006.01)
G06F 9/38 (2018.01)
G06F 9/30 (2018.01)
G06F 13/40 (2006.01)

(52) U.S. Cl.
CPC .......... *G06F 9/4881* (2013.01); *G06F 9/3004* (2013.01); *G06F 9/30036* (2013.01); *G06F 9/3842* (2013.01); *G06F 13/4022* (2013.01)

(58) Field of Classification Search
CPC .. G06F 9/4881; G06F 9/30036; G06F 9/3004; G06F 9/3842; G06F 9/3005; G06F 9/48; G06F 9/4806; G06F 9/4843; G06F 9/485; G06F 15/82; G06F 15/825; G06F 8/433; G06F 8/443; G06F 8/445; G06F 8/4451; G06F 8/4452; G06F 8/45; G06F 8/451; G06F 8/456; G06F 8/4432; G06F 8/4434; G06F 8/4435; G06F 8/4436; G06F 8/4441; G06F 8/4442; G06F 13/4022

USPC ....... 717/104, 127, 132, 131, 143, 151, 153, 717/155, 156, 157, 158, 159; 718/102–108; 712/11, 201, 245

See application file for complete search history.

(56) References Cited

U.S. PATENT DOCUMENTS

| | | | |
|---|---|---|---|
| 5,386,586 A | 1/1995 | Papadopoulos | |
| 8,250,555 B1 | 8/2012 | Lee et al. | |
| 8,615,770 B1 | 12/2013 | Stratton et al. | |
| 10,025,566 B1 | 7/2018 | Ahmed et al. | |

(Continued)

OTHER PUBLICATIONS

Al-Wattar, A. et al., Efficient On-line Hardware/Software Task Scheduling for Dynamic Run-Time Reconfiguration System, 2012, IEEE pp. 401-406. (Year: 2012).*

(Continued)

*Primary Examiner* — Eric Coleman
(74) *Attorney, Agent, or Firm* — Kligler & Associates Patent Attorneys Ltd (57) ABSTRACT

A processor includes a compute fabric and a controller. The compute fabric includes an array of compute nodes and interconnects that configurably connect the compute nodes. The controller is configured to receive a software program represented as a set of interconnected Data-Flow Graphs (DFGs), each DFG specifying code instructions that perform a respective portion of the software program, to schedule execution of the DFGs in time alternation, and, for each DFG being scheduled, to configure at least some of the compute nodes and interconnects in the compute fabric to execute the code instructions specified in the DFG, and send to the compute fabric multiple threads that each executes the code instructions specified in the DFG.

34 Claims, 5 Drawing Sheets

(56) References Cited

U.S. PATENT DOCUMENTS

| | | | |
|---|---|---|---|
| 10,289,672 | B1 | 5/2019 | Olkin |
| 10,579,390 | B2 | 3/2020 | Etsion et al. |
| 2003/0115352 | A1* | 6/2003 | Picraux ............... H04L 47/266 709/231 |
| 2004/0003220 | A1* | 1/2004 | May ....................... G06F 8/445 712/245 |
| 2005/0071835 | A1* | 3/2005 | Essick .................. G06F 9/3001 717/161 |
| 2007/0300214 | A1* | 12/2007 | Chang .................. G06F 8/4432 717/153 |
| 2008/0049022 | A1 | 2/2008 | Sherb et al. |
| 2010/0122105 | A1 | 5/2010 | Arslan et al. |
| 2013/0187932 | A1 | 7/2013 | Malakapalii et al. |
| 2013/0198757 | A1 | 8/2013 | Kim et al. |
| 2013/0247054 | A1 | 9/2013 | Schmidt et al. |
| 2013/0328890 | A1 | 12/2013 | Avkarogullari et al. |
| 2014/0259020 | A1* | 9/2014 | Kim .................... G06F 15/7885 718/102 |
| 2015/0268963 | A1* | 9/2015 | Etsion ..................... G06F 9/38 712/225 |
| 2016/0314175 | A1* | 10/2016 | Dhayapule ........... H04L 47/125 |
| 2017/0046138 | A1 | 2/2017 | Stanfill et al. |
| 2017/0154088 | A1 | 6/2017 | Sherman |
| 2017/0228319 | A1* | 8/2017 | Mueller ............... G06F 16/248 |
| 2018/0101387 | A1 | 4/2018 | Etsion et al. |
| 2018/0357049 | A1* | 12/2018 | Epstein ................. G06F 9/451 |
| 2019/0004878 | A1 | 1/2019 | Adler et al. |
| 2019/0042513 | A1* | 2/2019 | Fleming, Jr. ........ G06F 13/4027 |
| 2019/0102179 | A1 | 4/2019 | Fleming et al. |
| 2019/0102338 | A1 | 4/2019 | Tang et al. |
| 2019/0303153 | A1* | 10/2019 | Halpern ................ G06F 9/4494 |
| 2019/0324888 | A1* | 10/2019 | Evans ................. G06F 11/0709 |
| 2020/0004690 | A1 | 1/2020 | Mathew et al. |
| 2020/0159539 | A1 | 5/2020 | Etsion et al. |

OTHER PUBLICATIONS

Voitsechov et al., "Single-Graph Multiple Flows: Energy Efficient Design Alternative for GPGPUs", ISCA '14 Proceeding of the 41st annual international symposium on Computer architecture, pp. 205-216, Oct. 16, 2014.

Arvind et al., "Executing a program on the MIT tagged-token dataflow architecture", IEEE Transactions on Computers, vol. 39, No. 3, pp. 300-318, Mar. 1990.

Bakhoda et al., "Analyzing CUDA Workloads Using a Detailed GPU Simulator", IEEE International Symposium on Performance Analysis of Systems and Software (ISPASS—2009), pp. 163-174, Apr. 26-28, 2009.

Callahan et al., "Adapting Software Pipelining for Reconfigurable Computing", Proceedings of InternationalConference on Compilers, Architecture, and Synthesis for Embedded Systems, pp. 57-64, year 2000.

Che et al., "Rodinia: A Benchmark Suite for Heterogeneous Computing", Proceedings of the IEEE International Symposium on Workload Characterization (IISWC), pp. 44-54, Oct. 2009.

Culler et al., "Two fundamental limits on dataflow multiprocessing", Proceedings of the IFIP Working Group 10.3 (Concurrent Systems) Working Conference on Architectures and Compilation Techniques for Fine and Medium Grain Parallelism, pp. 153-164, Jan. 1993.

Cytron et al., "Efficiently computing static single assignment form and the control dependence graph", ACM Transactions on Programming Languages and Systems, vol. 13, No. 4, October, pp. 451-490, year 1991.

Dennis et al., "A preliminary architecture for a basic data flow processor", IISCA '75 Proceedings of the 2nd annual symposium on Computer architecture, pp. 125-131, year 1975.

El-Amawy et al., "Properties and performance of folded hypercubes", IEEE Transactions on Parallel and Distributed Systems, vol. 2, No. 1, pp. 31-42, Jan. 1991.

Franklin et al., "ARB: A Hardware Mechanism for Dynamic Reordering of Memory References", IEEE Transactions on Computers, vol. 45, issue 5, 552-571, May 1996.

Goldstein et al., "PipeRench: A Reconfigurable Architecture and Compiler", IEEE Computer, vol. 33, Issue 4, pp. 70-77, Apr. 2000.

Govindaraju et al., "Dynamically Specialized Datapaths for Energy Efficient Computing", 17th IEEE International Symposium on High Performance Computer Architecture, pp. 503-514, Feb. 2011.

Gupta et al., "Bundled execution of recurring traces for energy-efficient general purpose processing", International Symposium on Microarchitecture (MICRO), pp. 12-23, Dec. 3-7, 2011.

Gurd et al., "The Manchester prototype dataflow computer", Communications of the ACM—Special section on computer, vol. 28, Issue 1, pp. 34-52, Jan. 1985.

Hameed et al., "Understanding sources of inefficiency in general-purpose chips", International Symposium on Computer Architecture (ISCA), pp. 37-47, Jun. 19-23, 2010.

Hind et al., "Pointer analysis: haven't we solved this problem yet?", ACM SIGPLAN—SIGSOFT Workshop on Program Analysis for Software Tools and Engineering, pp. 54-61, Jun. 18-19, 2001.

Hong et al., "An Integrated GPU Power and Performance Model", International Symposium on Architecture (ISCA), pp. 280-289, Jun. 19-23, 2010.

Hormati et al., "Sponge: Portable Stream Programming on Graphics Engines", International Symposium on Architecture, Support for Programming Languages & Operating Systems (ASPLOS), pp. 381-392, Mar. 5-11, 2011.

Huang et al., "Elastic CGRAs", Proceedings of the ACM/SIGDA International symposium on Field programmable gate arrays (FPGA'13), pp. 171-180, Feb. 11-13, 2013.

Isci et al., "Runtime power monitoring in high-end processors: Methodology and empirical data", International Symposium on Microarchitecture (MICRO), pp. 93-104, Dec. 2003.

Keckler et al., "Life after Dennard and how I learned to love the picojoule", The 44th Annual IEEE/ACM International Symposium on Microarchitecture, Conference keynote (abstract—1 page), year 2011.

Keckler et al., "GPU's and the Future of Parallel Computing", IEEE Micro, vol. 31, issue 5, pp. 7-17, Sep.-Oct. 2011.

Khailany et al., "Imagine: Media Processing With Streams", IEEE Micro, vol. 21, pp. 35-46, 2011.

Lee et al., "Space-Time Scheduling of Instruction-Level Parallelism on a Raw Machine", ASPLOS VIII Proceedings of the eighth international conference on Architectural support for programming languages and operating systems, pp. 46-57, year 1998.

Leng et al., "GPUWattchy : Enabling Energy Optimizations in GPGPUs", International Symposium on Architecture (ISCA), pp. 487-498, year 2013.

Lindholm et al., "NVIDIA Tesla: A Unifies Graphics and Computing Architecture", IEEE Micro, vol. 28, No. 2, pp. 39-55, year 2008.

Mishra et al., "Tartan: Evaluating Spatial Computation for Whole Program Execution", ASPLOS XII Proceedings of the 12th international conference on Architectural support for programming languages and operating systems, pp. 163-174, Oct. 21-25, 2006.

Nickolls et al., "Scalable Parallel Programming with CUDA on Manycore GPUs", ACM Queue, vol. 6, No. 2, pp. 40-53, Mar.-Apr. 2008.

Nickolls et al., "The GPU computing era", IEEE Micro, vol. 30, No. 2, pp. 56-69, year 2010.

NVIDIA, "NVIDIA's Next Generation CUDATM Compute Architecture", FermiTM, Version 1.1, 22 pages, Oct. 2, 2009.

NVIDIA., "NVIDIA Tegra 4 family CPU architecture: 4-PLUS-1 quad core", 19 pages, 2013.

Khronos OpenCL Working Group, "The OpenCL Specification", Version 1.0, Document Revision 48, Oct. 6, 2009.

Ballance et al., "The program dependence web: a representation supporting control-, data-, and demand-driven interpretation of imperative languages", ACM SIGPLAN'90 Conference on Programming Language Design and Implementation, pp. 257-271, Jun. 20-22, 1990.

Papadopoulos et al., "Monsoon: An Explicit Token-Store Architecture", 25 years of the International Symposium on Computer architecture (selected papers) (ISCA '98), pp. 74-76, year 1998.

(56) References Cited

OTHER PUBLICATIONS

Russel, R., "THE Cray-1 Computer System", Communications of ACM, vol. 21, No. 1, pp. 63-72, Jan. Jan. 1978.

Sankaralingam et al., "Exploiting ILP, TLP, and DLP with the Polymorphous TRIPS Architecture", Proceedings of the 30th International Symposium on Computer Architecture (ISCA), pp. 422-433, year 2003.

Smith et al., "Dataflow Predication", Proceedings of the 39th Annual IEEE/ACM International Symposium on Microarchitecture, pp. 89-102, year 2006.

Swanson et al., "WaveScalar", Proceedings of the 36th International Symposium on Microarchitecture, 12 pages, Dec. 2003.

Taylor et al., "The Raw Microprocessor: A Computational Fabric for Software Circuits and General-Purpose Programs", IEEE Micro, vol. 22, No. 2, pp. 25-35, year 2002.

Thies et al., "Streamlt: A Language for Streaming Applications", Proceedings of the 11th International Conference on Compiler Construction, pp. 179-196, Apr. 2002.

Tullsen et al., "Simultaneous Multithreading: Maximizing On-Chip Parallelism", Proceedings of the 22nd Annual International Symposium on Computer Architecture (ISCA), pp. 392-403, Jun. 1995.

Yamamoto., "Performance Estimation of Multis treamed, Superscalar Processors", Proceedings of the 27th Annual Hawaii International Conference on System Sciences, vol. 1, pp. 195-204, year 1994.

Li et al., "McPAT: An Integrated Power, Area, and Timing Modeling Framework for Multicore and Manycore Architectures", 42nd Annual IEEE/ACM International Symposium on Microarchitecture (MICRO'09), pp. 469-480, Dec. 12-16, 2009.

Shen et al., "Modern Processor Design: Fundamentals of Superscalar Processors", Computer Science, pp. 2002.

Podlozhnyuk, "Image convolution with CUDA", NVIDIA, Technical Report, pp. 1-21, Jun. 2007.

NVIDIA, "CUDA Samples", Reference Manual, TRM-06704-001, verson 11.1, pp. 1-142, Oct. 2020 downloaded from http://developer.download.nvidia.com/compute/cuda/sdk/website/samples.html.

NVIDIA, "CUDA Programming Guide v7.0", RN-06722-001, pp. 1-21, Mar. 2015 downloaded from http://developer.download.nvidia.com/compute/cuda/7_0/Prod/doc/CUDA_Toolkit_Release_Notes.pdf.

Patt et al., "HPS, a new microarchitecture: rationale and introduction", ACM SIGMICRO, pp. 103-108, Dec. 1985.

Lattner et al., "LLVM: A compilation framework for lifelong program analysis & transformation", International Symposium on Code Generation and Optimization, pp. 1-11, Mar. 20-24, 2004.

Nowatzki et al., "Exploring the potential of heterogeneous von neumann/dataflow execution models", 2015 ACM/IEEE 42nd Annual International Symposium on Computer Architecture (ISCA), pp. 1-13, Portland, USA, Jun. 13-17, 2015.

Ho et al., "Efficient execution of memory access phases using dataflow specialization", 2015 ACM/IEEE 42nd Annual International Symposium on Computer Architecture (ISCA), pp. 1-13, Jun. 13-17, 2015.

Nowatzki et al., "Stream-dataflow acceleration," ISCA '17: Proceedings of the 44th Annual International Symposium on Computer Architecture, pp. 416-429, Toronto, Canada, Jun. 24-28, 2017.

Van Den Braak et al., "R-gpu: A reconfigurable gpu architecture," ACM Transactions on Architecture and Code Optimization, vol. 13, No. 1, article 12, pp. 1-24, Mar. 2016.

"MPI: A message-passing interface standard," version 3.1, pp. 1-868, Jun. 2015.

Agarwal et al., "The MIT alewife machine: Architecture and performance", ISCA '95: Proceedings of the 22nd annual international symposium on Computer architecture, pp. 2-13, May 1995.

Sanchez et al., "Flexible architectural support for fine-grain scheduling", ASPLOS Conference, pp. 1-12, Pittsburgh, USA, Mar. 13-17, 2010.

Voitsechov et al., "Control flow coalescing on a hybrid dataflow/von Neumann GPGPU," Intl. Symp. on Microarchitecture (MICRO-48), pp. 1-12, year 2015.

Campanoni et al., "HELIX-RC: An architecture-compiler co-design for automatic parallelization of irregular programs", 2014 ACM/IEEE 41st International Symposium on Computer Architecture (ISCA), pp. 1-12, Jun. 14-18, 2014.

Srinath et al., "Architectural specialization for inter-iteration loop dependence patterns", Proceedings of the 47th International Symposium on Microarchitecture (MICRO-47), pp. 1-13, Dec. 2014.

Rangan et al., "Decoupled software pipelining with the synchronization array", Proceedings of 13th International Conference on Parallel Architecture and Compilation Techniques (PACT), pp. 1-13, Jan. 2004.

Amd, ""Vega" Instruction Set Architecture", Reference guide, pp. 1-247, Jul. 28, 2017.

HSA Foundation, "HSA Programmer's Reference Manual: HSAIL Virtual ISA and Programming Model, Compiler Writer's Guide, and Object Format (BRIG)", Publication #: 49828, revision version 0.95, pp. 1-358, May 1, 2013.

Karp et al., "Properties of a Model for Parallel Computations: Determinacy, Termination, Queueing", SIAM Journal on Applied Mathematics, vol. 14, No. 6, pp. 1390-1411, Nov. 1966.

Wang et al., "CAF: Core to Core Communication Acceleration Framework", PACT '16, pp. 351-362, Haifa, Israel, Sep. 11-15, 2016.

International Application # PCT/IB2021/052104 Search Report dated Jun. 7, 2021.

International Application # PCT/IB2021/052105 Search Report dated May 31, 2021.

\* cited by examiner

| | | 0 | 1 | 2 | 3 | 4 | 5 | ... | $2^{14}$-1 |
|---|---|---|---|---|---|---|---|---|---|
| Before Executing DFG0 | FLOW_ID | 0 | 1 | 2 | 3 | 4 | 5 | ... | $2^{14}$-1 |
| | Next_DFG_ID | 0 | 0 | 0 | 0 | 0 | 0 | ... | 0 |
| Before Executing DFG1 (DFG0 committed) | FLOW_ID | 0 | 1 | 2 | 3 | 4 | 5 | ... | $2^{14}$-1 |
| | Next_DFG_ID | 1 | 1 | 2 | 2 | 1 | 1 | ... | 6 |
| Before Executing DFG2 (DFG1 committed) | FLOW_ID | 0 | 1 | 2 | 3 | 4 | 5 | ... | $2^{14}$-1 |
| | Next_DFG_ID | 3 | 4 | 2 | 2 | 5 | 6 | ... | 6 |
| Before Executing DFG3 (DFG2 committed) | FLOW_ID | 0 | 1 | 2 | 3 | 4 | 5 | ... | $2^{14}$-1 |
| | Next_DFG_ID | 3 | 4 | 6 | 6 | 5 | 6 | ... | 6 |
| Before Executing DFG3 (loop-DFG3 committed) | FLOW_ID | 0 | 1 | 2 | 3 | 4 | 5 | ... | $2^{14}$-1 |
| | Next_DFG_ID | 3 | 4 | 6 | 6 | 5 | 6 | ... | 6 |
| Before Executing DFG4 (DFG3 committed) | FLOW_ID | 0 | 1 | 2 | 3 | 4 | 5 | ... | $2^{14}$-1 |
| | Next_DFG_ID | 7 | 4 | 6 | 6 | 5 | 6 | ... | 6 |
| Before Executing DFG5 (DFG4 committed) | FLOW_ID | 0 | 1 | 2 | 3 | 4 | 5 | ... | $2^{14}$-1 |
| | Next_DFG_ID | 7 | 9 | 6 | 6 | 5 | 6 | ... | 6 |
| Before Executing DFG6 (DFG5 committed) | FLOW_ID | 0 | 1 | 2 | 3 | 4 | 5 | ... | $2^{14}$-1 |
| | Next_DFG_ID | 7 | 9 | 6 | 6 | 7 | 6 | ... | 6 |
| Before Executing DFG7 (DFG6 committed) | FLOW_ID | 0 | 1 | 2 | 3 | 4 | 5 | ... | $2^{14}$-1 |
| | Next_DFG_ID | 7 | 9 | 8 | 8 | 7 | 8 | ... | 8 |
| Before Executing DFG8 (DFG7 committed) | FLOW_ID | 0 | 1 | 2 | 3 | 4 | 5 | ... | $2^{14}$-1 |
| | Next_DFG_ID | 9 | 9 | 9 | 9 | 9 | 8 | ... | 9 |
| Before Executing DFG9 (DFG8 committed) | FLOW_ID | 0 | 1 | 2 | 3 | 4 | 5 | ... | $2^{14}$-1 |
| | Next_DFG_ID | 9 | 9 | 9 | 9 | 9 | 9 | ... | 9 |
| DFG9 committed (task terminated) | FLOW_ID | 0 | 1 | 2 | 3 | 4 | 5 | ... | $2^{14}$-1 |
| | Next_DFG_ID | T | T | T | T | T | T | ... | T |

*FIG. 4*

| DFG_ID / FLOW_ID | 0 (prolog) | 1 | 2 | 3 | 4 | 5 | 6 | 7 | ... |
|---|---|---|---|---|---|---|---|---|---|
| 0 | 1 | 0 | 0 | 0 | 0 | 0 | 0 | 0 | ... |
| 1 | 1 | 0 | 0 | 0 | 0 | 0 | 0 | 0 | ... |
| 2 | 0 | 1 | 0 | 0 | 0 | 0 | 0 | 0 | ... |
| 3 | 0 | 0 | 1 | 0 | 0 | 0 | 0 | 0 | ... |
| 4 | 0 | 0 | 0 | 1 | 0 | 0 | 0 | 0 | ... |
| 5 | 0 | 0 | 0 | 0 | 0 | 0 | 0 | 1 | ... |
| ⋮ | ⋮ | ⋮ | ⋮ | ⋮ | ⋮ | ⋮ | ⋮ | ⋮ | ⋮ |

HANDLING MULTIPLE GRAPHS, CONTEXTS AND PROGRAMS IN A COARSE-GRAIN RECONFIGURABLE ARRAY PROCESSOR

FIELD OF THE INVENTION

The present invention relates generally to processor architectures, and particularly to Coarse-Grain Reconfigurable Array (CGRA) processors.

BACKGROUND OF THE INVENTION

Coarse-Grain Reconfigurable Array (CGRA) is a computing architecture in which an array of interconnected computing elements is reconfigured on demand to execute a given program. Various CGRA-based computing techniques are known in the art. For example, U.S. Patent Application Publication 2018/0101387, whose disclosure is incorporated herein by reference, describes a GPGPU-compatible architecture that combines a coarse-grain reconfigurable fabric (CGRF) with a dynamic dataflow execution model to accelerate execution throughput of massively thread-parallel code. The CGRA distributes computation across a fabric of functional units. The compute operations are statically mapped to functional units, and an interconnect is configured to transfer values between functional units.

SUMMARY OF THE INVENTION

An embodiment of the present invention that is described herein provides a processor including a compute fabric and a controller. The compute fabric includes an array of compute nodes and interconnects that configurably connect the compute nodes. The controller is configured to receive a software program represented as a set of interconnected Data-Flow Graphs (DFGs), each DFG specifying code instructions that perform a respective portion of the software program, to schedule execution of the DFGs in time alternation, and, for each DFG being scheduled, to configure at least some of the compute nodes and interconnects in the compute fabric to execute the code instructions specified in the DFG, and send to the compute fabric multiple threads that each executes the code instructions specified in the DFG.

In some embodiments, the controller is configured to select one of the following, to serve as a next DFG: a DFG having a largest number of threads pending for execution; a DFG having a smallest number of code instructions; a DFG appearing next in a predefined order specified for the set of DFGs; and the same DFG as a currently executed DFG. In an embodiment, the controller is configured to switch between the software program and at least another software program represented as another set of interconnected DFGs.

In some embodiments, for a given DFG being scheduled, the controller is configured to send the threads to the compute fabric in successive batches, and the compute fabric is configured to execute the threads of each batch in a pipelined manner. In an example embodiment, the controller is configured to assign a first compute node in the compute fabric to serve as an initiator node that receives the batches of the threads and initiates execution of the batches, and to assign a second compute node in the compute fabric to serve as a terminator node that terminates execution of the batches. In an embodiment, the compute fabric is configured to save a state of the software program upon completion of execution of a batch of threads.

In some embodiments, for a given DFG being scheduled, the controller is configured to configure multiple subsets of the compute nodes in the compute fabric to concurrently execute multiple respective replicas representing the same portion of the software program.

In another embodiment, the controller is configured to continually maintain, at runtime, a table that specifies a respective next DFG for each of the multiple threads, and to schedule the execution of the threads in the DFGs based on the table. The controller may be configured to store the table in a first memory, and to cache a part of the table in a second memory having faster access than the first memory.

Additionally or alternatively, the controller may ne configured to store the set of DFGs in a first memory, and to cache a part of the set in a second memory having faster access than the first memory. In an embodiment, the controller is configured to prefetch one or more of the DFGs from the first memory to the second memory.

In yet another embodiment, the controller is configured to split the multiple threads into thread sets, and to execute the thread sets one after another. In still another embodiment, for a given DFG being scheduled, the controller, or a compute node that does not participate in executing the code instructions specified in the given DFG, is configured to deactivate at least part of the compute node. In a disclosed embodiment, for a given DFG being scheduled, the controller is configured to deactivate at least part of a switch that controls one or more interconnects, which do not participate in executing the code instructions specified in the given DFG.

In an example embodiment, a compute node in the compute fabric is configured to switch-over from a currently-configured DFG to a next DFG in response to verifying that the compute node has completed processing all the threads associated with the currently-configured DFG. In another embodiment, the controller is configured to configure the compute fabric according to a next DFG, concurrently with execution of the code instructions according to a currently-configured DFG. In an embodiment, when a next DFG is the same as a currently-configured DFG, the controller may be configured to send one or more threads associated with the next DFG to the compute fabric, before the fabric has completed execution of the threads associated with the currently-configured DFG.

There is additionally provided, in accordance with an embodiment of the present invention, a computing method including, in a processor that includes a compute fabric including an array of compute nodes and interconnects that configurably connect the compute nodes, receiving a software program represented as a set of interconnected Data-Flow Graphs (DFGs), each DFG specifying code instructions that perform a respective portion of the software program. Execution of the DFGs is scheduled in time alternation. For each DFG being scheduled, at least some of the compute nodes and interconnects in the compute fabric are configured to execute the code instructions specified in the DFG, and multiple threads, which each executes the code instructions specified in the DFG, are sent to the compute fabric.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and devices for Coarse-Grain Reconfigurable Array (CGRA) computing. An example CGRA-based processor comprises a coarse-grain compute fabric, and a controller that configures and controls the compute fabric. The compute fabric comprises (i) an array of compute nodes and (ii) interconnects that configurably connect the compute nodes. The controller receives compiled software code, also referred to as a software program, which is represented as a Data-Flow Graph (DFG). The controller configures the compute nodes and the interconnects in accordance with the DFG, thereby configuring the fabric to execute the program. The controller then sends to the compute fabric multiple threads, which the fabric executes in accordance with the DFG in a pipelined manner. The multiple threads typically execute the same code, as represented by the DFG, on different data. (Strictly speaking, different threads differ slightly from one another in that they depend on the thread number, e.g., in specifying different memory addresses from which to fetch the different data. Nevertheless, in the present context such threads are regarded herein as executing the same code.) Certain aspects of running multiple threads on a CGRA fabric are addressed in U.S. Patent Application Publication 2018/0101387, which is cited above and whose disclosure is incorporated herein by reference.

In many practical cases, however, the software program is far too large to be mapped onto the compute fabric in its entirety. Thus, in some embodiments of the present invention, the software program provided to the controller is represented as a set of interconnected DFGs, rather than as a single DFG. Each DFG specifies code instructions that perform a respective portion of the program. Each DFG has a single input and one or more exits. The DFGs are interconnected in accordance with a predefined interconnection topology that follows the high-level flow control of the program. This structure is typically provided by a compiler. (Note that, even when the compute fabric is large enough to map the entire code, there may be other reasons for dividing the code into multiple DFGs, e.g., due to branches.)

In the disclosed embodiments, the controller comprises a scheduler that schedules execution of the various DFGs on the fabric in time alternation. When a certain DFG is scheduled, the scheduler "maps the DFG onto the fabric," i.e., configures at least some of the compute nodes and interconnects in the fabric to execute the code instructions specified in the DFG. The scheduler sends to the fabric multiple threads for execution, and the fabric executes the threads in accordance with the DFG, typically beginning with reading initial values for the various threads from memory. During the execution of the threads on the currently-scheduled DFG, the fabric saves the results of the various threads to memory, and the scheduler reconfigures the fabric to execute the next DFG. Scheduling, reconfiguration and execution proceeds in this manner until all threads complete executing the software program, or until the controller decides to suspend processing for any reason.

In some embodiments, the scheduler continually maintains a "Next DFG table" (NDT) that specifies, for each thread, the next DFG that the thread is to execute on. The NDT is useful, for example, for efficiently choosing batches of threads for sending to the fabric, and for determining the number of pending threads for each NDT. The latter information may be used as a scheduling criterion, e.g., by scheduling the DFG having the largest number of pending threads. Other example scheduling criteria are also disclosed.

In some embodiments, the controller uses the same compute fabric to run multiple separate software programs, possibly associated with multiple different users. Each program is represented using a respective structure of interconnected DFGs, as described above. Alternation between programs is typically performed at the execution boundary between DFGs, i.e., when the threads of the program to be suspended complete execution on a certain DFG. At such points, the state of the program (e.g., the DFG configuration, NDT, memory state and live values) is fully-defined.

In the present context, the term "live values" (LVs) refers to temporary results of threads that are saved to memory during execution in order to be used later by the same thread in a different DFG. Such memory may be implemented in various ways, e.g., as part of the L1 cache or separate from L1 cache, as a cache or as a scratch pad, etc. When alternating between programs, the controller typically saves the state of the program being suspended, and loads the state of the program being resumed.

Various implementation examples of compute fabrics, compute nodes, schedulers, and the data structures they use, are described herein. Aspects of information caching and prefetching are also addressed. Also described are the functions of initiator and terminator nodes in the fabric that are assigned to begin and end thread execution. Initiator and terminator nodes may be implemented in Load-Store Unit (LSU) compute nodes of the fabric.

System Description

Figure 1:
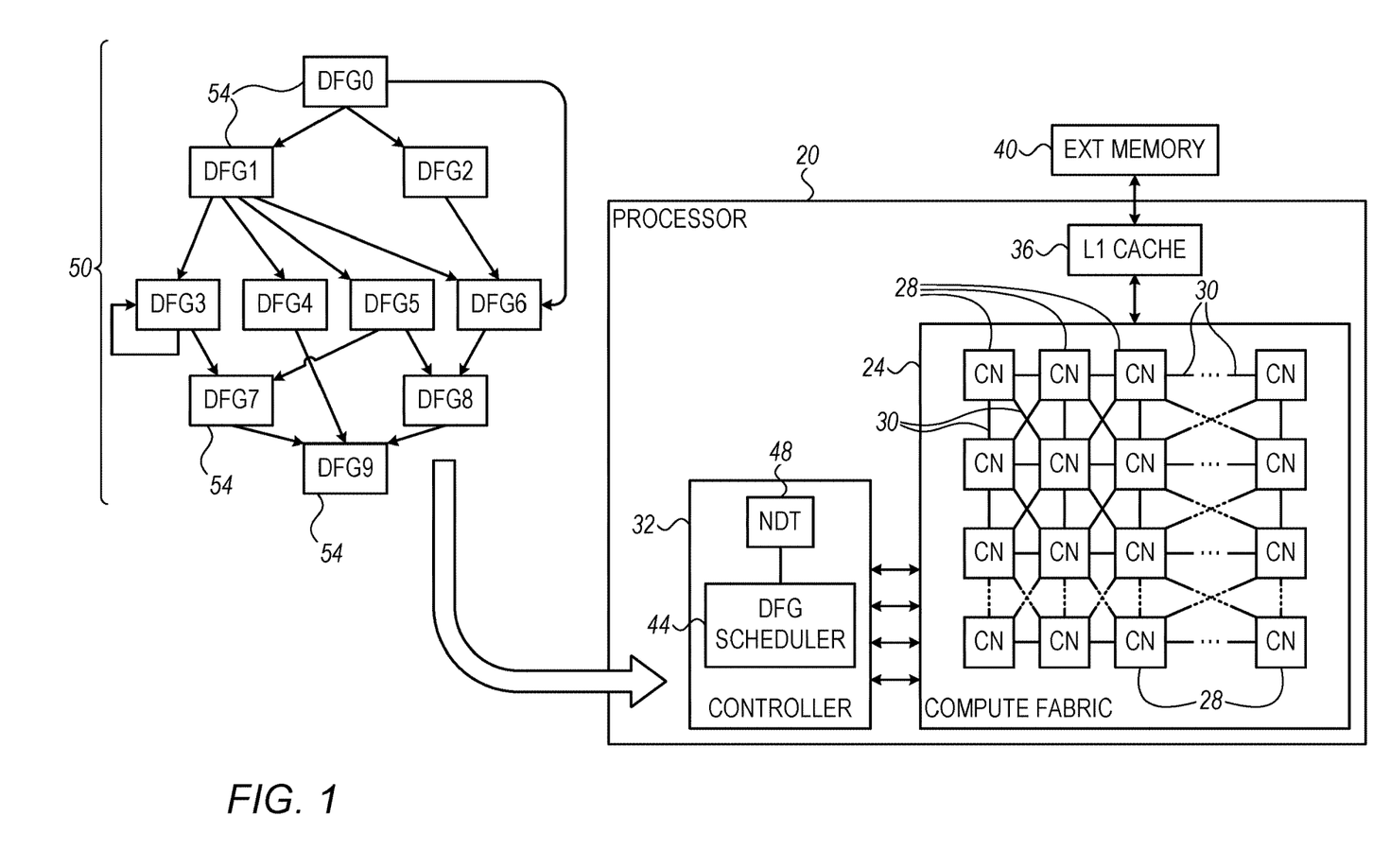
FIG. 1 is a block diagram that schematically illustrates a Coarse-Grain Reconfigurable Array (CGRA) processor, in accordance with an embodiment of the present invention.

FIG. 1 is a block diagram that schematically illustrates a Coarse-Grain Reconfigurable Array (CGRA) processor 20, in accordance with an embodiment of the present invention. Processor 20 is based on a reconfigurable compute fabric 24, which comprises multiple Compute Nodes (CNs) 28 arranged in an array. CNs 28 are also referred to as simply "nodes" for brevity. In an example embodiment, fabric 24 has a total of 256 CNs 28, arranged in a 16-by-16 array, although any other suitable number and arrangement of CNs can be used.

CNs 28 in fabric 24 are connected to one another using interconnects 30, for transferring data and control information (referred to as "tokens") between CNs. In the present embodiment, each CN 28 comprises a switch (not seen in FIG. 1, examples shown in FIGS. 2 and 3 below) that is configurable to connect the CN with one or more selected neighboring CNs. In some embodiments, CNs 28 may send and/or receive additional control information, e.g., configurations and/or exceptions. Such information may be transferred over separate interconnections, e.g., a control network that is separate from interconnects 30. See, for example, the interconnects labeled "TO/FROM CONTROLLER" in FIGS. 2 and 3 below.

Processor 20 further comprises a Level-1 (L1) cache (or, alternatively, a multi-level cache), which is connected to an external memory 40 and to fabric 24. Cache 36 and external memory 40 are referred to collectively as the memory system of the processor. At least some of CNs 28 in fabric 24 are configured to store data in the memory system and to load data from the memory system.

Figure 2:
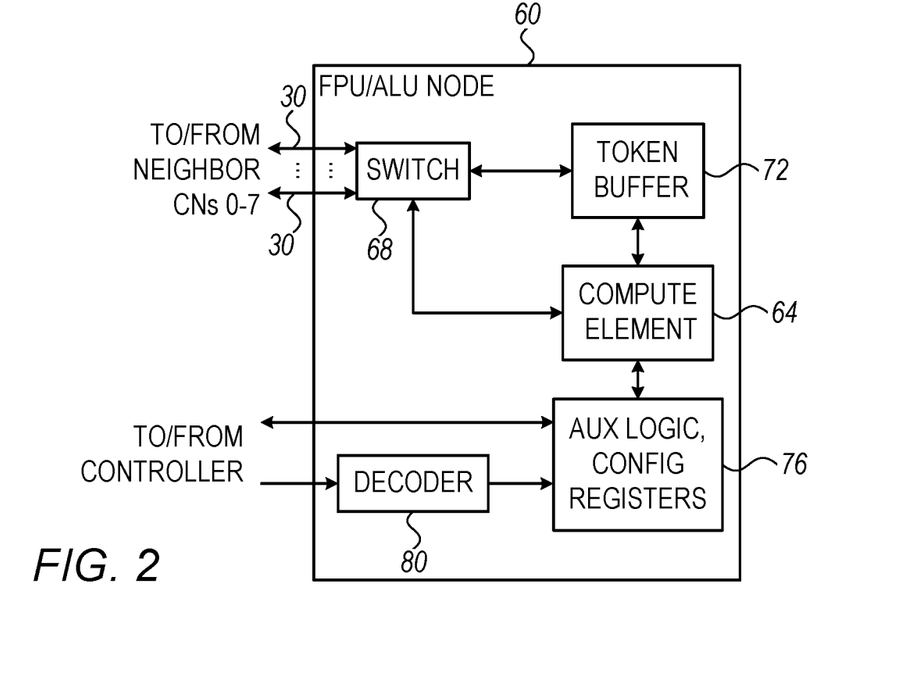
FIG. 2 is a block diagram that schematically illustrates an FPU/ALU node in the CGRA processor of FIG. 1, in accordance with an embodiment of the present invention.
Figure 3:
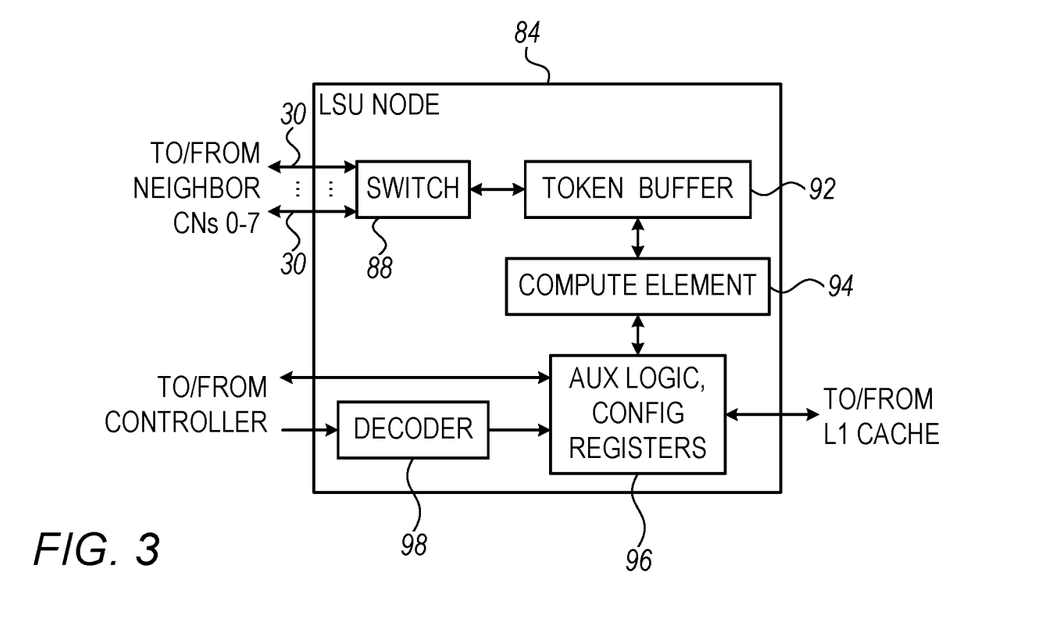
FIG. 3 is a block diagram that schematically illustrates an LSU node in the CGRA processor of FIG. 1, in accordance with an embodiment of the present invention.

In some embodiments, all CNs 28 in fabric 24 are similar in structure. In other embodiments, fabric 24 comprises CNs of two or more different types. FIGS. 2 and 3 below show examples of a Floating Point Unit/Arithmetic Logic Unit (FPU/ALU) CN that is configured to perform mathematical computations, and a Load-Store Unit (LSU) CN that is configured to perform memory load and store operations. In some embodiments, the LSU CNs are located along the perimeter of fabric 24, in order to simplify their interconnection to the memory system. FPU/ALU CNs may be located at any suitable locations in fabric 24. Other types of CNs, not discussed in detail herein, may comprise control CNs, and CNs that perform high-complexity computations such as division or square-root computations.

Processor 20 further comprises a controller 32 that, among other functions, configures fabric 24 to carry out desired computational tasks. Controller 32 typically configures the functionality of each CN, and the interconnection topology between CNs. Controller 32 typically configures fabric 24 by sending control registers to CNs 28 over the control network.

Controller 32 typically receives a compiled version of the software code, produced by a suitable compiler. The compiled code comprises a representation of the software code as a structure 50 of interconnected Data Flow Graphs (DFGs) 54. Each DFG 54 represents a respective section of the code, and has a single entry point and one or more exit points. Each DFG is a directed graph, in which vertices represent code instructions and arcs represent the data flow between instructions. An exit point of a DFG (e.g., a conditional or unconditional branch, a function call or a return from a function, etc.) comprises an instruction that leads to an input of a (different or the same) DFG, or terminates the program.

In order to execute a given DFG, controller 32 configures selected CNs 28, and the interconnections between them, to execute the code instructions and the flow-control specified in the DFG. This operation is also referred to as "mapping the DFG onto the fabric."

A typical DFG begins with readout of initial values (live values) and possibly data from the memory system, then proceeds to perform a sequence of instructions that process the data and possibly store it, and ends with storage of the live values. Generally, however, loading of values from memory (both live values and data) and/or storage of values to memory may be performed at any stage of the DFG, not necessarily at the beginning/end. In an example implementation, controller 32 configures the fabric to execute such a DFG by assigning one or more LSU CNs to read the initial values, assigning appropriate CNs (e.g., FPU/ALU CNs) to execute the instructions specified in the DFG, and assigning one or more LSU CNs to store the results. Controller 32 also configures the switches of one or more CNs, in order to interconnect the CNs according to the flow specified in the DFG. Examples of such configurations can be found in U.S. Patent Application Publication 2018/0101387, cited above.

Once configured with a given DFG, fabric 24 is able to execute multiple threads, each thread performing the instructions of the given DFG on different data, in a pipelined manner. In such a pipelined operation, a given CN executes the same instruction in the DFG (with different arguments), for different threads. As soon as the CN completes execution of the instruction for one thread, it is ready to execute it for the next thread. Typically, different threads process different data since load instructions that load data for the thread specify addresses that depend on the thread ID.

Typically, the size of fabric 24 is not sufficient for executing the entire structure 50, i.e., all DFGs, simultaneously. Thus, in some embodiments, controller 32 comprises a DFG scheduler 44 that schedules execution of the various DFGs 54 in time alternation. Scheduler 44 schedules the DFGs using a data structure referred to as a Next DFG Table (NDT) 48. The operation of scheduler 44 and the various data structures used for scheduling, are described in detail below.

FIG. 2 is a block diagram that schematically illustrates an FPU/ALU node 60, in accordance with an embodiment of the present invention. The configuration of node 60 can be used for implementing at least some of CNs 28 in fabric 24 of CGRA processor 20 of FIG. 1.

FPU/ALU node 60 comprises a compute element 64, a switch 68 and a token buffer 72. Switch 68 is configured to connect node 60 to one or more selected neighbor CNs in fabric 24, for receiving input tokens from neighbor CNs and for sending output tokens to neighbor CNs. Input tokens may comprise, for example, data and meta-data (control information) from neighbor CNs to be used as operands in the computation of node 60. Output tokens may comprise, for example, results of the computation of node 60 that are provided to neighbor CNs for subsequent processing. Input and output tokens may also comprise control information.

In the present example, node 60 can be connected to any of eight nearest neighbor CNs 28 in fabric 24, denoted CN0 . . . CN7. As such, node 60 has eight interconnects 30 connected to switch 68. Alternatively, any other suitable interconnection topology can be used.

Token buffer 72 is configured to store input tokens that were received from neighbor CNs and are pending for processing, and/or output tokens that were processed and are pending for outputting to neighbor CNs. Compute element 64 comprises the circuitry that performs the computations of node 60, e.g., an FPU, an ALU, or any other suitable computation.

Consider a scenario in which controller 32 configures fabric 24 to execute a certain DFG 54. As part of this configuration, FPU/ALU node 60 is assigned to execute a certain code instruction in the DFG. To perform this role, controller 32 configures compute element 64 to perform the computation specified in the instruction, e.g., an addition or multiplication. Controller 32 also configures switch 68 to connect the appropriate interconnects 30 to the CNs that supply inputs to the code instruction and consume the result of the code instruction. This switch may also be configured to transfer values to other CNs without going through compute element 64.

In the present example, node 60 further comprises auxiliary logic 76 and a decoder 80. Auxiliary logic 76 comprises configuration registers that hold the configuration parameters of switch 68 and compute element 64, as configured by controller 32. In addition, auxiliary logic 76 may perform functions such as communication with controller 32, interrupt handling, counters management and the like.

In a typical configuration process, controller 32 sends to FPU/ALU node 60 one or more instructions that configure the configuration registers in auxiliary logic 76. Decoder 80 decodes the instructions received from controller 32, and configures the configuration registers accordingly. As will be explained below, in some embodiments node 60 comprises dual configuration registers (also referred to as "shadow registers") for enabling fast switch-over between DFGs.

FIG. 3 is a block diagram that schematically illustrates an LSU node 84, in accordance with an embodiment of the present invention. The configuration of node 84 can be used for implementing at some of CNs 28 in fabric 24 of CGRA processor 20 of FIG. 1.

LSU node 84 is configured to execute load and store instructions, i.e., load data from memory 40 via cache 36, and store data to memory 40 via cache 36. As noted above, LSU nodes are typically located along the perimeter of fabric 24, to simplify their interconnection to the memory system.

LSU node 84 comprises a switch 88, a token buffer 92 and a decoder 98, which are similar in structure and functionality to switch 68, buffer 72 and decoder 80 of FPU/ALU node 60, respectively. Node 84 additionally comprises a compute element 94 that is used, for example, for memory address computations. Node 84 further comprises auxiliary logic 96, which performs functions such as communication with controller 32, communication with L1 cache 36, storage of configuration registers, interrupt handling, counters management, NDT update, as well as initiator and terminator functions (to be explained below).

In alternative embodiments, initiator and terminator functions may be implemented in separate CNs, not in LSU nodes 84. Thus, in the present context, the terms "initiator" and "terminator" refer to any CN that performs initiator and terminator functions, respectively. Initiator and terminator functions may be implemented in dedicated CNs, or combined with other functions in the same CN, e.g., in an LSU node.

In some embodiments, when mapping a given DFG onto fabric 24, scheduler 44 may deactivate (e.g., power-off) one or more of CNs 28 that do not participate in executing the code instructions specified in the given DFG, in order to reduce power consumption. The scheduler may deactivate only parts of a CN, e.g., only a switch (e.g., switch 68 or 88) or only a compute element (e.g., element 64 or 94).

The configurations of CGRA processor 20, FPU/ALU node 60 and LSU node 84, and their various components, as shown in FIGS. 1-3, are example configurations that are depicted purely for the sake of conceptual clarity. In alternative embodiments, any other suitable configurations can be used. Additional aspects of multi-threaded CGRA processors are addressed in U.S. Patent Application Publication 2018/0101387, cited above.

In various embodiments, processor 20 and its elements may be implemented using any suitable hardware, such as in an Application-Specific Integrated Circuit (ASIC) or Field-Programmable Gate Array (FPGA). In some embodiments, some of the elements of processor 20, e.g., controller 32, may be implemented using a programmable processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

DFG Scheduling

In many practical cases, the overall software program to be executed by processor 20 is too large to be mapped in its entirety onto fabric 24. Thus, in some embodiments, the overall program is partitioned into multiple DFGs, and controller 32 maps different DFGs onto fabric 24 at different times, in a suitable alternation schedule. In the embodiments described herein, although not necessarily, the assumption is that fabric 24 is configured with one selected DFG at a time.

Moreover, processor 20 is typically required to execute the software program multiple times, on different data. Each such instance is referred to herein as a thread. Fabric 24 is able to execute several threads concurrently, in a pipelined manner. In an example embodiment, the total number of threads is divided into sets (referred to as "sets of threads" or "thread sets"). Controller 32 works with an initiator to initiate threads via "thread batches." Typically, the initiator creates a thread every cycle according to the batch of threads it gets. An example size of a thread set is 16000, and an example size of a batch of threads is sixty-four. Alternatively, any other suitable numbers may be used. Each thread in the set of threads is assigned an identifier denoted "Flow_ID", depending on the place of the thread in the thread batch and to the number of batches already processed. The initiator may then calculate the thread ID ("tid") according to the thread set ID.

Consider the example of structure 50, on the left-hand side of FIG. 1 above. In this example, the compiler has partitioned the software program into ten DFGs 54 denoted DFG0 . . . DFG9. The high-level flow-control of the program is represented by arrows connecting the DFGs outputs and inputs. DFG0 is the first DFG being executed, possibly starting from some memory state. DFG9 is the last DFG being executed, ending with another memory state, i.e., the final results of the various threads.

As seen in FIG. 1, the high-level flow-control of structure 50 has several possible paths from DFG0 to DFG9. The different paths are due, for example, to data-dependent differences in execution, e.g., conditional branch instructions. Therefore, in practice, some threads will traverse one path while other threads will traverse a different path.

Put in another way, some DFGs have multiple exits, and different threads may exit a given DFG at different exits. DFG0, for example, has three possible exits, leading to DFG1, DFG2 and DFG6. In this example, for some threads, the next DFG to be executed after DFG0 is DFG1, for other threads the next DFG is DFG2, and for yet other threads the next DFG is DFG6. As another example, DFG3 has two possible exits, one leading to DFG7, and the other looping back to the input of DFG3. This structure occurs, for example, when DFG3 implements a loop iteration in the code.

In a typical flow of operation, DFG scheduler 44 in controller 32 schedules the various DFGs 54, one at a time, to execute on fabric 24. Typically, when a certain DFG is being executed, fabric 24 will execute only a partial subset of the threads, e.g., only threads that (i) follow the flow-control path traversing the current DFG and (ii) have their initial values ready from a previous DFG. When alternating from one DFG to another, it is necessary to save the results of the threads running on the former DFG (the live values), so they can be read as initial values by the (same) threads running on the latter DFG.

Figure 4:
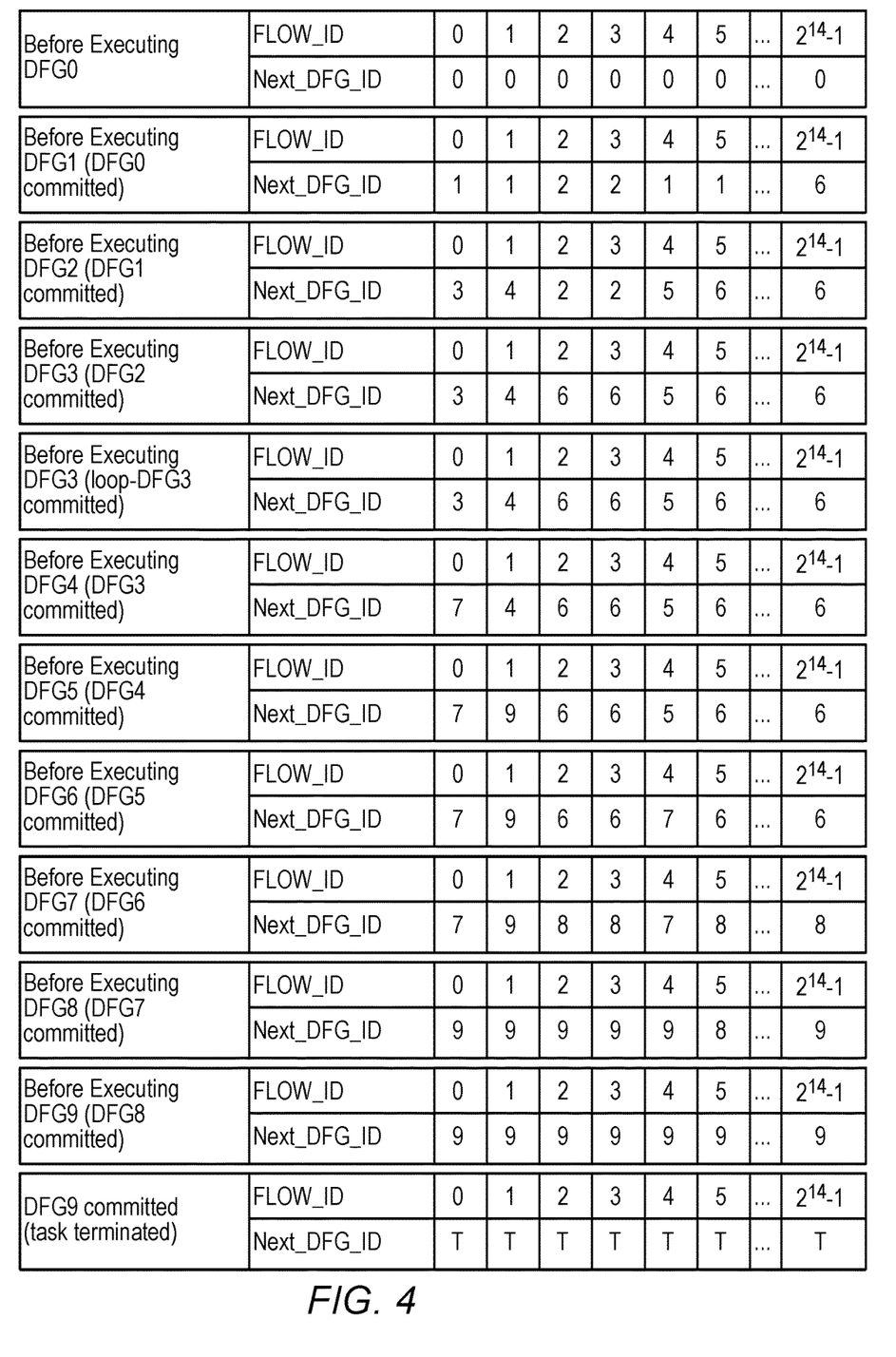
FIG. 4 is a diagram showing a table that specifies the next Data-Flow Graph (DFG) to be scheduled for multiple threads at various program execution states, in accordance with an embodiment of the present invention.

FIG. 4 is a diagram showing a table that specifies the next DFG 54 in structure 50 to be scheduled for multiple threads at various program execution states, in accordance with an embodiment of the present invention. The example of FIG. 4 assumes that scheduler 44 schedules the DFGs in increasing order of the DFG indices (i.e., DFG0, then DFG1, then DFG2, and so on).

The table is depicted twelve times in FIG. 4, corresponding to twelve different stages of execution. The first stage (seen at the top of the figure) is before DFG0 is executed. The second stage is after executing 16K threads on DFG0 and before executing threads on DFG1, and so on. At each stage, the table specifies, for each thread in the set of threads (for each Flow_ID in $\{0, 1, 2, \ldots, 2^{14}-1\}$), the index of the next DFG to be executed. The last stage is after all threads in DFG9 were executed, in which case there is no next DFG and all table entries are set to "Termination" (T).

Figure 5:
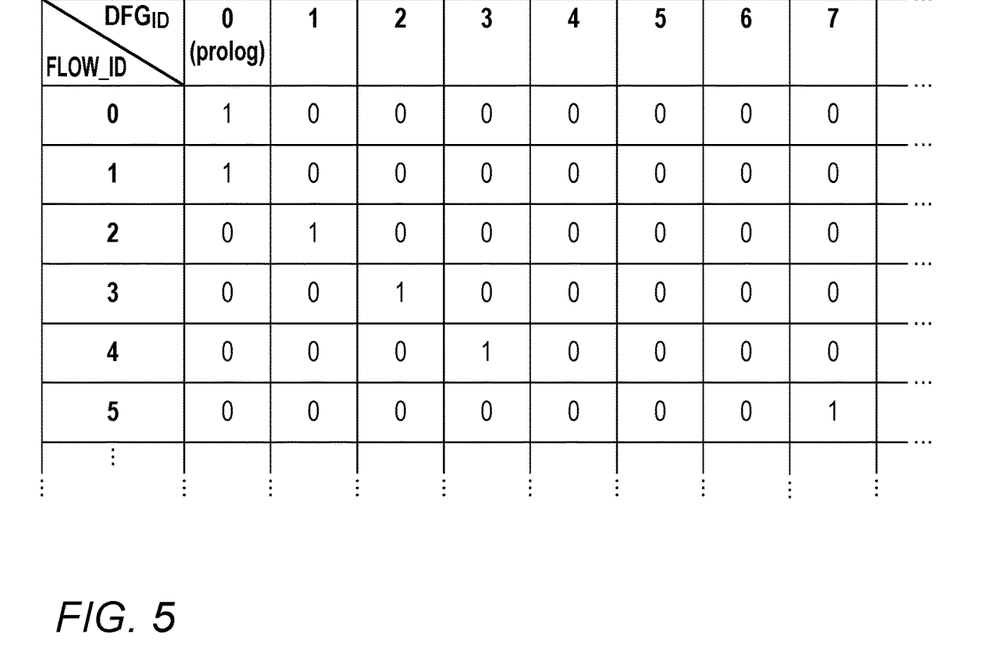
FIG. 5 is a diagram showing a Next DFG Table (NDT), in accordance with an embodiment of the present invention.

FIG. 5 is a diagram showing Next DFG Table (NDT) 48, in accordance with an embodiment of the present invention. The entries of NDT 48 are used by scheduler 44 in scheduling execution of DFGs. The scheduler also updates the NDT as execution progresses.

Each row of NDT 48 corresponds to a respective Flow_ID, i.e., a respective thread in the set of threads. Each column corresponds to a respective DFG. In a given row (corresponding to a thread), the entry in the column corresponding to the next DFG to be executed for this thread is set to "1". All other entries in the row are set to "0".

The NDT structure simplifies the operation of scheduler 44. For example, the scheduler may determine that the number of threads to be executed in DFG K is M, by simply counting the number of "1" entries in the $K^{th}$ column. (Alternatively, the NDT may explicitly store the number of threads that need to execute on each DFG.) For DFG K, the scheduler may obtain the indices of the threads that will execute if this DFG is scheduled next, by extracting the row indices of the "1" entries in the $K^{th}$ column.

Typically, controller 32 holds NDT 48 (e.g., the NDT shown in FIG. 5) and not the table of FIG. 4. In some embodiments, controller 32 may hold both the table of FIG. 4, and NDT 48.

Figure 6:
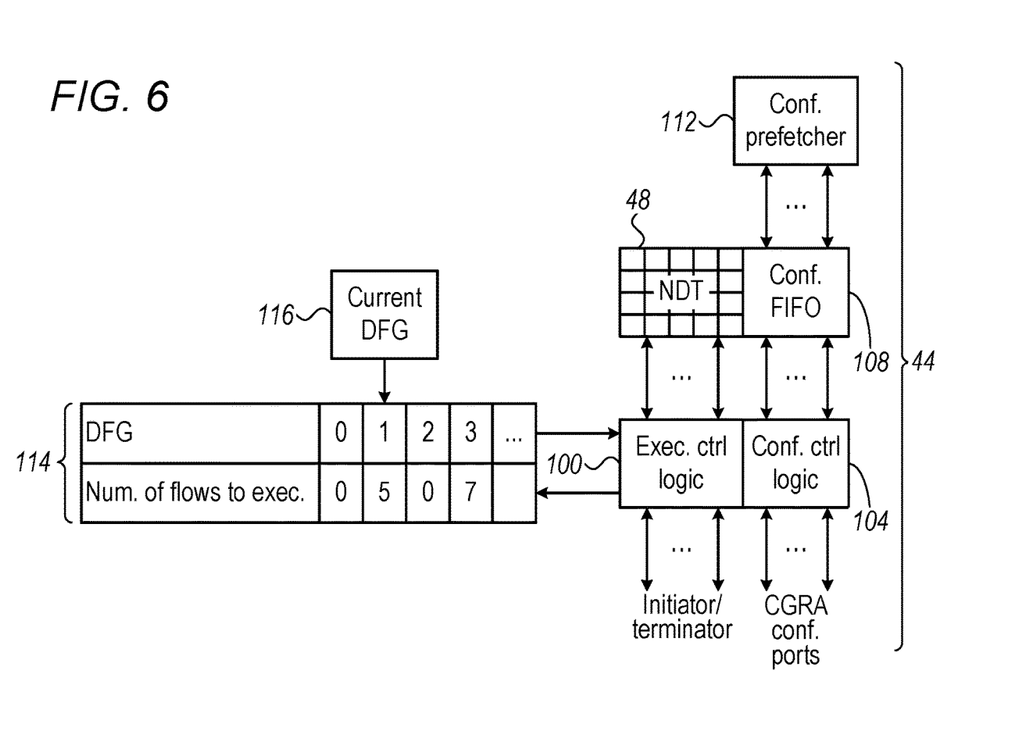
FIG. 6 is a block diagram that schematically illustrates a DFG scheduler in the CGRA processor of FIG. 1, in accordance with an embodiment of the present invention.

FIG. 6 is a block diagram that schematically illustrates DFG scheduler 44 in accordance with an embodiment of the present invention. In the present example, scheduler 44 comprises execution control logic 100 and configuration control logic 104.

Execution control logic 100 performs the actual scheduling, i.e., selects the next DFG (or DFGs) to be executed. Execution control logic 100 also communicates with one or more of the CNs in fabric 24 that act as initiators or terminators (possibly LSU nodes), e.g., for sending thread batches for execution and receiving information regarding thread batches that have completed execution.

Configuration control logic 104 configures CNs 28 and the interconnections between them in fabric 24, in accordance with the configuration of the currently selected DFG. The DFG configuration typically specifies (i) a set of CNs 28 being configured, (ii) a configuration for each CN, and (iii) a configuration of the interconnections between CNs. In some embodiments, e.g., when the switches are internal to the CNs, the interconnection configuration may be regarded as part of the CN configuration.

In the present example, execution control logic 100 selects the next DFG or DFGs using NDT 48 described above, and using a DFG sequence table 114. DFG sequence table 114 specifies, for each DFG, the total number of threads that are ready to execute on that DFG. A pointer 116 points to the entry of the DFG that is currently being executed in fabric 24.

In an example embodiment, execution control logic 100 identifies the DFG having the largest number of ready threads, and selects this DFG to execute next. In some cases this criterion may lead to a no progress situation, and therefore logic 100 may occasionally deviate from it and revert to a different criterion.

Generally, since the high-level flow-control of the program (e.g., structure 50 in FIG. 1) is usually far from trivial, various scheduling orders are possible, and logic 100 may use various criteria for setting the scheduling order of DFGs. The criterion described above is only one non-limiting example—Several alternative criteria are suggested further below.

In some embodiments, scheduler 44 comprises a configuration prefetcher 112, which prefetches one or more DFG configurations from the memory system in advance. For this purpose, execution logic 100 may indicate not only the next DFG to be scheduled, but a sequence of two or more DFGs to be scheduled next. Prefetcher 112 prefetches the DFG configurations in accordance with this sequence, and stores the DFG configurations in a configuration First-In First-Out (FIFO) buffer 108. Configuration control logic 104 reads the appropriate prefetched DFG configuration from FIFO 108, and sends the DFG configuration to fabric 24. Additionally or alternatively, configuration control logic 104 may also read DFG configurations directly from the memory system.

In some embodiments, scheduler 44 holds a small subset of the most frequently-used DFG configurations in a private cache. In some embodiments, when multiple processors such as processor 20 are implemented on a chip, the chip may hold a larger cache that is accessible to the various processors 20 and holds additional DFG configurations.

In some embodiments, prefetcher 112 prefetches the next non-empty DFG (the next DFG having threads ready to execute) immediately after execution of the present DFG has begun. In some embodiments, the compiler may indicate the identities of one or more target DFGs that are likely to be updated with high frequency and should be prefetched. Target DFGs that are updated with low frequency (e.g., corner cases, rare illegal values) may be updated in a L2 NDT cache (see section on NDT caching below) and not prefetched.

In some embodiments, scheduler 44 (typically logic 104) sends the configuration of a prefetched DFG to fabric 24, while the present DFG is still being executed. In an embodiment, CNs 28 of fabric 24 hold dual configuration registers (also referred to as "shadow registers") for storing configurations in accordance with the present DFG and with the next (prefetched) DFG. When execution of the present DFG is completed, scheduler 44 sends a reset signal to the CNs, which in turn load the configuration in accordance with the next DFG from the appropriate shadow registers.

The configuration of DFG scheduler 44 shown in FIG. 6 is an example configuration that is depicted purely for the sake of conceptual clarity. In alternative embodiments, any other suitable configuration can be used. For example, scheduler 44 of FIG. 6 uses one interface ("data path") for providing threads and data to fabric 24, and a separate interface ("control path") for sending DFG configurations to the fabric. In alternative embodiments, threads, data and DFG configurations can be provided over a single interface.

In an embodiment, scheduler 44 sends a batch of threads to an initiator as a tuple of the form {Thread_batch_bitmap, Thread_batch_ID, Thread_set_ID), wherein Thread_batch_bitmap is a bitmap indicating which of the consecutively subsequent FLOW_ID's are scheduled to execute on the current DFG. For example, scheduler 44 may send Thread_batch_bitmap as a 64-bit register that specifies which FLOW_IDs will be executed in the batch of threads (e.g., "1" indicating a thread to be executed, and "0" indicating a thread that will not be executed). Thread_batch_ID represents the number of the batch within the Thread_set, and thread_set_ID indicates the ID of the thread set. These parameters enable the initiator to calculate the Thread ID (tid) of each thread in the batch, i.e., the number of the Thread_set, the number of the batch of threads, and the exact number of the thread within the batch.

In some embodiments, in order to ensure that fabric 24 is aware of all the DFGs that are to be scheduled, and to enable efficient DFG prefetching and scheduling, scheduler 44 holds a table of the following form:

TABLE 1

Example DFT table

| DFG id | DFG pointer | # of threads to execute | # of times executed |
|---|---|---|---|
| 0 | 0xXXX1000 | 0 | 0 |
| 1 | 0xXXX2000 | 0 | 0 |
| 2 | 0xXXX3000 | 0 | 0 |
| 3 | 0xXXX4000 | N | 1 |
| 4 | 0xXXX5000 | M | 0 |
| 5 | 0xXXX6000 | N | 0 |
| 6 | 0xXXX7000 | K | 0 |
| 7 | 0xXXX8000 | 0 | 0 |
| 8 | 0xXXX9000 | 0 | 0 |
| 9 | 0xXXXA000 | 0 | 0 |

In the DFG table, "DFG id" denotes the index of the DFG, "DFG pointer" denotes the address in which the DFG is stored in the memory system (e.g., using a format similar to an IP address), "# of threads to execute" denotes the number of threads that are ready to execute on the relevant DFG, and "# of times executed" denotes the number of times the DFG was scheduled continuously on the last time it was scheduled.

Figure 7:
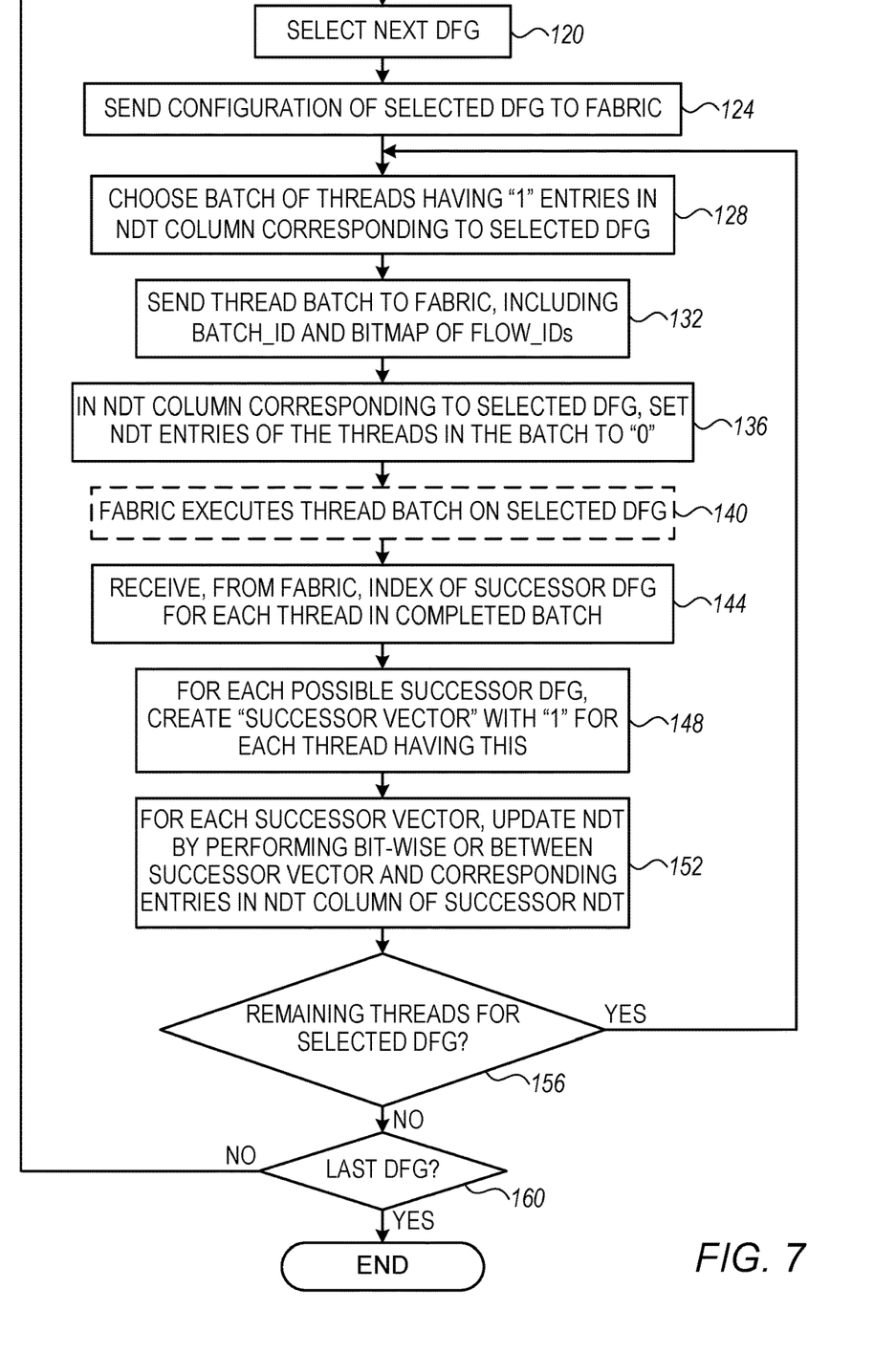
FIG. 7 is a flow chart that schematically illustrates a method for DFG scheduling in the CGRA processor of FIG. 1, in accordance with an embodiment of the present invention.

FIG. 7 is a flow chart that schematically illustrates a method for DFG scheduling, and thread scheduling when executing the DFG, carried out by DFG scheduler 44 of processor 20, in accordance with an embodiment of the present invention. The method begins with scheduler 44 (typically logic 100) selecting a DFG to be scheduled next, at a DFG selection step 120. Any suitable scheduling criterion can be used for this selection. The index of the selected DFG is denoted K below.

At a configuration sending step 124, scheduler 44 (typically logic 104) sends the configuration of the selected DFG to fabric 24. The various CNs 28 of fabric 24 receive their respective configuration parameters, and configure accordingly. From this stage, the selected DFG is mapped onto the fabric, and the fabric is ready to execute threads.

At a batch selection step 128, scheduler 44 (typically logic 100) selects a batch of threads (typically up to sixty four) for execution. As explained above with regard to FIG. 5, the $K^{th}$ column in NDT 48 (the column corresponding to the selected DFG) has "1"s in the rows corresponding to the threads for which the next DFG is K, and "0"s in the other rows. Thus, scheduler 44 selects the batch of threads from among the threads whose entries in NDT column K are "1". In other words, scheduler 44 extracts the part of the $K^{th}$ column of NDT 48 (possibly not a contiguous part of the column) that corresponds to the FLOW_IDs of the threads in the batch. Scheduler 44 sends this part of the $K^{th}$ column as Thread_batch_bitmap to the initiator.

At a batch sending step 132, scheduler 44 (typically logic 100) sends the selected batch of threads to fabric 24, for execution in accordance with the selected DFG. As noted above, the batch of threads is typically sent as a tuple of the form {Thread_batch_bitmap, Thread_batch_ID, Thread_set_ID). Alternatively, any other suitable representation of the thread batch can be used.

At a nulling step 136, scheduler 44 (typically logic 100) accesses column K of NDT 48, and nulls (sets to "0") the entries in this column that correspond to the threads in the batch.

At an execution step 140, fabric 24 begins to execute the batch of threads in accordance with the currently-configured DFG.

Once the execution of all the threads in the batch was initiated (but typically before execution is complete) scheduler 44 (typically logic 100) sends the next batch of threads to the initiator. Logic 100 may use a FIFO for sending batches efficiently.

As the threads are executed in the fabric, the terminators collect the completed threads in batches. Once a batch is completed in a terminator, the terminator sends the batch back to controller 32 (or updates the NDT directly) in a completion message, at a batch completion step 144. The completion message indicates, for each thread in the batch, the identity of the next DFG in which the thread is to continue executing. For a given thread, the next DFG in which the thread is to continue executing is referred to as the "successor DFG" of this thread.

In one embodiment, for any given DFG, the maximal number of possible successor DFGs is 2, and the indices of the possible successor DFGs are known to the fabric and to the scheduler. Therefore, fabric 24 may report the successor DFG of each thread by sending to scheduler 44 two 64-bit bitmaps. Each bit in the two bitmaps corresponds to a respective thread in the batch. One bitmap corresponds to one successor DFG (denoted "DFG A") and the other bitmap corresponds to the other successor DFG (denoted "DFG B"). The bit value for a thread is set to "1" in the first bitmap if the successor DFG of the thread is the DFG A, and to "0" if not. Similarly, in the second bitmap, the bit value for a thread is set to "1" if the successor DFG of the thread is DFG B, and to "0" if not.

In other embodiments, the maximal number of possible successor DFGs for any given DFG is larger than 2. In such cases, a larger number of bits is needed for indicating the successor DFG for each thread. In one embodiment, the maximal number of possible successor DFGs for any given DFG is 4, requiring two bits for reporting each successor DFG. To report the successor DFGs for a batch of sixty-four threads, fabric 24 may send four 64-bit bitmaps, e.g., in successive clock cycles.

Scheduler 44 (typically logic 100) now proceeds to update NDT 48 with the successor DFGs of the threads in the batch that was just completed. At a vector creation step 148, scheduler 44 creates a respective 64-bit "successor vector" for each possible successor DFG. In the $N^{th}$ successor vector, which corresponds to the $N^{th}$ successor DFG, the scheduler sets the entries of all the FLOW_IDs whose successor DFG is the $N^{th}$ successor DFG to "1", and the other entries to "0".

At an NDT updating step 152, scheduler 44 (typically logic 100 but possibly directly by the terminator) updates NDT 48 using the successor vectors. For a given successor vector (which corresponds to a certain successor DFG), scheduler 44 updates the NDT column that corresponds to this DFG. In an embodiment, scheduler 44 performs a bit-wise logical OR between the successor vector and the corresponding entries in the NDT column ("corresponding entries" in this context meaning entries corresponding to the threads in the completed batch). In this manner, "1" values in the successor vector will be transferred to the NDT, to indicate the new successor DFG of these threads. Existing "1" values in the NDT will not be overwritten.

At a first checking step 156, scheduler 44 (typically logic 100) checks with the initiator whether there are additional threads remaining for execution of the currently configured DFG. If so, the method loops back to step 128 above, for choosing and processing the next batch of threads. Typically, the check (for threads remaining for execution on the currently configured DFG) is performed immediately upon sending the bitmaps to the terminator, in parallel to other stages. In some embodiments, a check of this sort is also performed with the terminator, in order to decide when all threads have completed execution (in which case a switch can be made to the next DFG).

Otherwise, a second checking step 160, scheduler 44 (typically logic 100) checks whether the currently configured DFG is the last DFG. If not, the method loops back to step 120 above, for choosing and processing the next DFG. If the currently configured DFG is the last DFG, the method terminates.

The flow of FIG. 7 is an example flow, which is depicted purely for the sake of conceptual clarity. In alternative embodiments, any other suitable flow can be used for implementing the disclosed scheduling techniques.

In various embodiments, scheduler 44 (typically logic 100) may use various scheduling criteria for selecting the next DFG at step 120. In some embodiments, scheduler 44 schedules the DFGs in cyclic sequential order, i.e., using Round-Robin scheduling. The DFGs typically have no internal loops. Therefore, the time slice of the Round-Robin scheme can be limited by setting a maximal Time-To-Live (TTL) for each DFG, after which a switch is made to the next DFG.

In alternative embodiments, scheduler 44 may select the next DFG using any other suitable scheduling criterion. Non-limiting examples of scheduling criteria may comprise selecting the smallest DFG (the DFG having the smallest number of instructions) not including the current DFG, selecting the DFG having the largest number of threads to execute (not including the current DFG), or selecting the DFG in accordance with some suitable predefined order. The order may be defined, for example, by the compiler or by the software code itself.

In some cases (see, for example, DFG3 in FIG. 1) one of the successor DFGs of a given DFG is the same DFG. This scenario occurs, for example, in loops, as in DFG3 of FIG. 1. In some embodiments, execution of a thread on such a DFG will be regarded complete after one pass through the DFG (and then the scheduler may decide to execute the same DFG again immediately). In other embodiments, execution of a thread on such a DFG will be regarded complete after completing all the required passes through the DFG (until the next DFG for the thread becomes a different DFG).

In some embodiments, when configuring fabric 24 to execute a certain DFG, scheduler 44 configures the fabric with multiple replicas of the DFG that will run concurrently. This feature is useful, for example, for DFGs that are considerably smaller than the fabric. In these embodiments, the DFG replicas execute the same section of the program, but are mapped to different subsets of CNs 28. In particular, each replica of the DFG has its own initiator and terminator nodes (initiator and terminator functionality is explained further below).

In an embodiment, scheduler 44 is configured to send multiple tuples of {Thread_batch_bitmap, Thread_batch_ID, Thread_set_ID} in the same cycle. In this embodiment, scheduler 44 is also configured to receive multiple completion messages (each reporting bitmaps of successor DFGs for its respective DFG replica) in the same cycle. Such bitmaps may arrive in the scheduler out-of-order.

Thus, scheduler 44 should support both sending and receiving bitmaps in the same cycle, meaning that the scheduler may access NDT 48 with both reads and writes in the same cycle. In some embodiments, NDT 48 provides both read and write ports. Typically, a "read-and-reset" policy is used, which resets words when they are read. This design can be used to avoid adding an extra write port.

In an embodiment, scheduler 44 is responsible for initializing the NDT line representing the prologue (the first DFG executed in a program (set of threads)).

Program State and Multi-Program Operation

As explained above, a software program in processor 20 comprises a structure of interconnected DFGs, and a set of threads. In some embodiments, the state of a program is fully defined when a certain DFG has completed execution, before execution of the next DFG begins. At these points in time, the state of the program is fully specified by (i) the identity of the next DFG for each thread in the thread set, (ii) the live values of the variables used by each thread in the thread set, and (iii) the memory state. Controller 32 may commit this full state to the memory system upon completion of execution of each DFG.

In other embodiments, the state of a software program is fully defined when a certain number of threads has completed execution on a certain DFG, and the rest of the threads did not begin execution. This scenario typically occurs when completing a specific DFG, but may also be initiated by the controller during the execution of a DFG (e.g., due to a request from higher-level software for context switch). The controller would then stop sending new batches of threads to the initiator, and wait until all the threads that are already running in the DFG to complete execution.

In some embodiments, processor 20 may run multiple separate software programs (separate thread sets, running on separate structures 50 of DFGs 54) in alternation. Such alternation is referred to as "multi-program operation, since different programs may be associated with different users. In these embodiments, controller 32 performs two levels of alternation. At the higher level, controller 32 alternates between two or more structures 50 of DFGs 54. At the lower level, controller 32 schedules the DFGs 54 within a certain program. As part of this two-level alternation, controller 32 maintains and saves the state of each program separately.

When switching from one program to another, controller 32 typically saves the state of the program being paused, and retrieves the state of the program being resumed. In some embodiments, the controller may use an "eager" eviction/fetching mechanism that proactively evicts all state information of the previous program and loads all state information of the new program in response to the switch. In other embodiments, the controller may use a "lazy" eviction/ fetching mechanism that loads state information for the new program when the information is required, and evicts state information of the previous program when necessary, e.g., when memory space becomes limited.

In one embodiment, when switching programs, controller 32 evicts cached information (e.g., DFGs, NDT, live values and/or memory state) of the old program from local memory to higher-hierarchy memory. In another embodiment, after switching to a new program, if information for the new program is to be transferred from higher-hierarchy memory to a local memory, the controller allocates space for the new information in the local memory and, if needed, evicts information of the old program from the local memory for this purpose.

In some embodiments, there exists a "garbage disposal" process that releases memory from programs (possibly users) for which it was decided not to keep their live values, NDT and/or DFGs. The controller may release a program from memory, for example, because the program completed execution, or because the controller (or higher level software) decided to terminate its execution for any reason.

In some embodiments, L1 cache 36 comprises a virtual-access cache, in which case the controller typically flushes it upon switching programs.

The state of a program is not necessarily complete at each cycle. Typically, the state of a program is complete, i.e., fully defined, only upon completing execution of a thread batch (or the entire thread set) on a certain DFG. At these points in time controller 32 saves the state to the memory system. These are also the times at which it is permitted to switch fabric 24 from one DFG to another.

In various embodiments, processor 20 may use various techniques for verifying whether the state of the current program is complete or not. In some embodiments, circuitry in processor 20 (e.g., scheduler 44 or a CN 28 in fabric 24) counts the number of threads that completed execution on the present DFG, and in this manner verifies whether a batch of threads (or the entire thread set) completed execution. In other embodiments, a "final token" is sent along the DFG from the initiator node to the terminator node after the last batch of threads was initiated on the preset DFG. The CNs do not permit the final token to bypass other tokens. Arrival of the final token at the terminator node is used as a verification that the set of threads completed execution.

NDT, DFG and Live-Value Caching

In some embodiments, controller 32 stores only part of the NDT, DFG configurations and/or live variable values, locally in a close and fast-access memory. The rest of this information is stored in a higher memory hierarchy that is larger but slower to access. The information that is not stored locally may be compressed. In an embodiment, fetching and/or eviction of information (e.g., DFG, NDT, live values and/or other information) is performed during processing of the present DFG in fabric 24.

For example, in some practical cases the number of concurrently-active DFGs 54 is larger than the number of DFGs that can be represented in-memory in NDT 48. Thus, in some embodiments controller 32 manages NDT 48 as a cache. Typically, processor 32 calculates the address of a thread batch as a function of the thread_batch_ID and DFG_ID.

In an embodiment, before executing a certain DFG 54, scheduler 44 prefetches the 16K bitmap indicating which threads in the thread set should be executed (the NDT column corresponding to the next DFG) from the memory system.

In an embodiment, during execution, if the thread_batch_bitmap being written (the bitmap indicating the flow IDs of threads in the current thread batch) is present in the NDT L1 cache, scheduler 44 updates thread_batch_bitmap locally in the NDT and writes thread_batch_bitmap to the next NDT hierarchy (L2 cache/DRAM). If the thread_batch_bitmap in question is not present in the NDT L1 cache, scheduler 44 updates thread_batch_bitmap only in the next cache hierarchy.

Controller 32 may use various eviction policies for evicting thread_batch_bitmaps from the NDT L1 cache. In one embodiment, preference is given to eviction of empty thread_batch_bitmaps that contain only zeros.

As another example, in some embodiments controller 32 manages the DFG configurations as a cache. In an embodiment, controller 32 refrains from evicting the current DFG, and its possible successor DFG, from the cache. Other than these, DFGs may be evicted using any suitable criterion, e.g., a Least Recently Used (LRU) criterion.

Additionally or alternatively, controller 32 may use any of the following eviction criteria and prefetching criteria:
Evict a DFG that has no pending threads ready to run on.
Evict a DFG in accordance with an order specified by the compiler or by the software code itself (e.g., according to the high-level flow control of DFGs 54 in DFG structure 50).
Prefetch a DFG having the largest number of threads (tid's) pending for execution, e.g., according to the DFG table (such as Table 1 above) or DFG sequence table 114 (FIG. 6).
Prefetch a DFG in accordance with an order specified by the compiler or by the software code itself (e.g., according to the high-level flow control of DFGs 54 in DFG structure 50).

Initiator and Terminator Operation

In some embodiments, each of the LSU nodes in fabric (e.g., node 84 of FIG. 3) can serve as an initiator or as a terminator. In other embodiments, the initiators and terminators are implemented as dedicated CNs. An initiator is a CN that begins execution of threads in a DFG. A terminator is a CN that completes execution of threads in a DFG.

An initiator typically receives thread batches from scheduler 44 for execution. The initiator then computes the Thread IDs (tid's) for the initiated threads and sends the tid's to its successor CNs 28 in fabric 24 (one after another). Upon receiving a tid, each CN 28 executes its configured computation, and forwards the result to the next CN according to the DFG. Thus, each tid travels through fabric 24 as a data token.

Typically, a thread batch is communicated between scheduler 44 and the initiator as a (Thread_batch_id, Thread_batch_bitmap, Thread_set_ID) tuple. When a thread batch arrives in an initiator, the initiator analyzes the bitmap to identify the Thread IDs it should initiate (e.g., by adding the indices of the set bits in the bitmap to Thread_batch_ID). To avoid stalls, the initiator may use prefetching and double buffering ("shadowing") of thread batches. Whenever a thread batch is received, the initiator immediately requests the next thread batch from scheduler 44.

When an entire thread set completes execution on the present DFG (or when the scheduler decides to end the thread set for some reason, e.g., to perform context switch), i.e., when the scheduler has no remaining thread batches to send, the initiator sends a "final token" down the fabric. This token is not permitted to bypass any other tokens. The final token is sent to all replicas of the DFG, and is used by terminator nodes for verifying that the thread set is completed.

In an example embodiment, the initiator operates in accordance with the following pseudo-code:

```
while( Receive (Flow_Batch bitmap, Batch_ID, Thread_setID)
from DFGS) {
  *pre-fetch next Flow_Batch bitmap
    ffs = find_first_index(Flow_Batch bitmap)
    while (ffs != NULL){
        Flow_ID = (Batch_ID << 6) + ffs
        Token = Create_Token(metadata: Flow_ID,
Slow_ID, value: Thread_set_ID)
        Send (Token) to switch
    }
}
```

A terminator executes the final branch instruction that exits the present DFG. In the disclosed embodiments, each exit point from a DFG is implemented as a branch instruction, referred to herein as an "exit branch" for brevity. The target address of an exit branch is the start address of the next DFG. An exit branch may be a conditional or unconditional branch instruction. An exit branch may be, for example, a direct branch instruction, an indirect branch instruction, a predicated branch instruction, or a "thread halt" instruction. A DFG may comprise any suitable number of exit points, possibly a single exit point. An exit branch can be located anywhere in the DFG, not necessarily the last instruction.

For exit branches implemented as direct branches, the identities of the successor DFGs are indicated to the terminator node when it is initially configured (as part of configuring the fabric to execute the present DFG). At runtime, the input token (or tokens) to the terminator node, or the terminator node itself, determines the successor DFG according to the branch condition. The successor DFG is determined per thread, depending on the outcome (taken/not taken) of the branch condition for each thread. In an embodiment, the terminator node holds four 64-bit bitmaps. As the threads of the batch complete execution, the terminator node gradually constructs a pair of 64-bit bitmaps, one bitmap for each possible successor DFG (one bit map for each possible outcome of the branch decision).

When all the threads in the batch completed execution, the terminator node holds two bitmaps. In one bitmap, the set bits indicate the threads for which the successor DFG corresponds to the "taken" outcome. In the other bitmap, the set bits indicate the threads for which the successor DFG corresponds to the "not taken" outcome.

When the next batch of thread begins execution, the terminator node uses the other pair of 64-bit bitmaps. This mechanism enables the terminator to return to the first pair of bitmaps in case of out-of-order thread batches. If another batch of threads arrives (i.e., a new address) the terminator updates the least-recently used 64-bit bitmap in the NDT.

For exit branches implemented as indirect branches, the terminator node typically calculates the target addresses of the successor DFGs at runtime using the above-described mechanism. The terminator node computes the address of each successor DFG and updates the relevant 64-bit bitmap. Once a new 64-bit bitmap is needed (e.g., when the present batch of threads is a new batch, or when the successor DFG is different) the terminator node updates the least-recently used 64-bit bitmap in the NDT.

In some embodiments, the terminator node may additionally receive a respective predicate per thread, i.e., a Boolean value that specifies whether the branch is the actual exit point of the DFG or not. The terminator may receive the predicate in an input token. Since a DFG may have several exit points, in the multiple-exit case each exit point will typically be predicated. Per thread, only the actual exit point will receive a true predicate, and the other exit points will receive false predicates.

Upon receiving a final token, the terminator node updates all its active 64-bit bitmaps in the NDT (i.e., updates the NDT with the identities of the successor DFG of each completed thread). Once the NDT update is known to be complete, the terminator node notifies scheduler 44 of the completion by sending a final token. This reporting mechanism enables the scheduler to ensure that all terminators, of all the replicas of the present DFG, have completed executing their respective thread batches.

In an embodiment, instead of using final tokens, scheduler 44 counts the number of thread batches sent to the initiators (e.g., the number of bitmaps sent to the initiators) and compares this number to the number of completed thread batches reported by the terminators (e.g., to the number of bitmaps reported by the terminators). When the number of sent batches (e.g., bitmaps) equals the number of received batches (e.g., bitmaps), the scheduler concludes that execution of the present DFG is completed. At this stage, controller 32 may regard the program state as complete (fully defined), save the state, and switch to a new DFG (of the same program/user or of a different program/user).

In an example embodiment, the terminator operates in accordance with the following pseudo-code:

```
NDT_Bitmaps = map<NDT_Batch_Address, Thread_Bitmap>
BATCH_BITS = log2(batch_size) // log2(64) = 6
while(Executing the DFG) {
    Receive (Flow_ID, Target_DFG_ID) from token buffer
    Batch_ID = (Flow_ID >> BATCH_BITS)
    NDT_Batch_Address = Compute_Address(Batch_ID,
Target_DFG_ID)
    // Pack bitmap, evict and create a fresh bitmap if
needed
    if (NDT_Bitmaps.ContainsKey(NDT_Batch_Address)){
        NDT_Bitmaps[NDT_Batch_Address] |= (1 <<
(Flow_ID % batch_size));
    }else{
        if (NDT_Bitmaps.Size( ) >= MAX_NDT_BITMAPS){
            Evict(NDT_Bitmaps.LRU( ))
        }
        NDT_Bitmaps[NDT_Batch_Address] = (1 <<
(Flow_ID % batch_size))
    }
}
```

DFG Switch-Over Considerations

In the embodiments described above, the switch-over from one DFG to the next is performed at the same time for all CNs 28 in fabric 24. Although simpler to implement, this solution is sub-optimal in terms of latency. In alternative embodiments, the switch-over from one DFG to the next may be performed at different times for different CNs 28. For example, a given CN 28 may switch to the next DFG in response to detecting that it has completed its part in executing all the threads in the current thread set. Such CN-specific switch-over reduces the latency overhead incurred by initiating a new DFG.

In the present context, the term "switch-over time" refers to the time at which the CN hardware (e.g., compute element, switch) is reconfigured in accordance with the next DFG. The configuration setting for the next DFG is typically provided to the CN in advance, and stored in the CN's shadow configuration registers.

In an example embodiment, as noted above, the initiator generates a final token after initiating the last batch of threads in the thread set. CNs 28 pass the final token from one to another through fabric 24, according to the data flow specified by the DFG, until reaching the terminator. In some cases, when the data flow splits into multiple paths and later merges, a given CN 28 will receive multiple final tokens. Each CN is aware of the number of final tokens that should pass through it en-route to the terminator. Thus, each CN 28 is able to verify whether it has completed its part in executing all the threads in the current thread set, by counting the final tokens passing through the CN.

In some embodiments, a given CN 28 detects that it has forwarded the last final token, and in response switches-over to the configuration of the next DFG. Additionally, a CN that is not active in the next DFG may power-off in response to detecting it has forwarded the last final token. This detection and switch-over (or deactivation) is typically independent of any other CN. When CNs 28 operate in this manner, the switch-over to the next DFG will typically occur gradually through fabric 24, with CNs closer to the initiator switching earlier, and CNs further away from the initiator switching later.

In such embodiments, the initiator may begin sending the threads of the next DFG via the fabric sooner, before all the CNs have switched over (i.e., which some of the CNs, closer to the terminator, are still busy executing the last threads of the previous DFG). As a result, the latency incurred by initiating the new DFG is reduced.

In one embodiment, once verifying that the last final token has passed, the CN reconfigures all of its components (e.g., both the compute element and the switch) to the configuration of the next DFG. In other embodiments, the CN reconfigures only partially, e.g., reconfigures only the compute element and part of the switch but not all of it. The remaining CN components are still reconfigured at the same time, e.g., once the last final token reaches the terminator.

Another scenario, in which it is possible to start processing the next DFG while the current DFG is still being processed, is when the next DFG is the same as the current DFG. Such a scenario occurs, for example, when the DFG corresponds to an iteration (or several iterations) of a program loop. In such a case, switching-over between the DFGs does not require reconfiguring the CNs. Thus, in some embodiments, when the next DFG is the same as the currently-configured DFG, scheduler 44 is permitted to send to fabric 24 threads associated with the next DFG, before the fabric has completed processing the threads associated with the current DFG.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A processor, comprising:
   a compute fabric, comprising an array of compute nodes and interconnects that configurably connect the compute nodes; and
   a controller, configured to:
   receive a software program represented as a set of interconnected Data-Flow Graphs (DFGs), each DFG specifying code instructions that perform a respective portion of the software program;
   schedule execution of the DFGs one at a time; and
   for each DFG being scheduled, configure at least some of the compute nodes and interconnects in the compute fabric to execute the code instructions specified in the DFG, and send to the compute fabric multiple threads that each executes the code instructions specified in the DFG,
   such that for a first DFG that is scheduled before a second DFG, at least some of the compute nodes and interconnects in the array are configured to execute the first DFG at a first time, and the same compute nodes and interconnects are then reconfigured to execute the second DFG at a second time, later than the first time.

2. The processor according to claim 1, wherein the controller is configured to select one of the following, to serve as a next DFG:
   a DFG having a largest number of threads pending for execution;
   a DFG having a smallest number of code instructions;
   a DFG appearing next in a predefined order specified for the set of DFGs; and
   the same DFG as a currently executed DFG.

3. The processor according to claim 1, wherein the controller is configured to switch between the software program and at least another software program represented as another set of interconnected DFGs.

4. The processor according to claim 1, wherein, for a given DFG being scheduled, the controller is configured to send the threads to the compute fabric in successive batches, and wherein the compute fabric is configured to execute the threads of each batch in a pipelined manner.

5. The processor according to claim 4, wherein the controller is configured to assign a first compute node in the compute fabric to serve as an initiator node that receives the batches of the threads and initiates execution of the batches, and to assign a second compute node in the compute fabric to serve as a terminator node that terminates execution of the batches.

6. The processor according to claim 4, wherein the compute fabric is configured to save a state of the software program upon completion of execution of a batch of threads.

7. The processor according to claim 1, wherein, for a given DFG being scheduled, the controller is configured to configure multiple subsets of the compute nodes in the compute fabric to concurrently execute multiple respective replicas representing the same portion of the software program.

8. The processor according to claim 1, wherein the controller is configured to continually maintain, at runtime, a table that specifies a respective next DFG for each of the multiple threads, and to schedule the execution of the threads in the DFGs based on the table.

9. The processor according to claim 8, wherein the controller is configured to store the table in a first memory, and to cache a part of the table in a second memory having faster access than the first memory.

10. The processor according to claim 1, wherein the controller is configured to store the set of DFGs in a first memory, and to cache a part of the set in a second memory having faster access than the first memory.

11. The processor according to claim 10, wherein the controller is configured to prefetch one or more of the DFGs from the first memory to the second memory.

12. The processor according to claim 1, wherein the controller is configured to split the multiple threads into thread sets, and to execute the thread sets one after another.

13. The processor according to claim 1, wherein, for a given DFG being scheduled, the controller, or a compute node that does not participate in executing the code instructions specified in the given DFG, is configured to deactivate at least part of the compute node.

14. The processor according to claim 1, wherein, for a given DFG being scheduled, the controller is configured to deactivate at least part of a switch that controls one or more interconnects, which do not participate in executing the code instructions specified in the given DFG.

15. The processor according to claim 1, wherein a compute node in the compute fabric is configured to switch-over from a currently-configured DFG to a next DFG in response to verifying that the compute node has completed processing all the threads associated with the currently-configured DFG.

16. The processor according to claim 1, wherein the controller is configured to configure the compute fabric according to a the next DFG, concurrently with execution of the code instructions according to a currently-configured DFG.

17. The processor according to claim 1, wherein, when a next DFG is the same as a currently-configured DFG, the controller is configured to send one or more threads associated with the next DFG to the compute fabric, before the fabric has completed execution of the threads associated with the currently-configured DFG.

18. A computing method, comprising:
in a processor that includes a compute fabric comprising an array of compute nodes and interconnects that configurably connect the compute nodes, receiving a software program represented as a set of interconnected Data-Flow Graphs (DFGs), each DFG specifying code instructions that perform a respective portion of the software program;
scheduling execution of the DFGs one at a time; and
for each DFG being scheduled, configuring at least some of the compute nodes and interconnects in the compute fabric to execute the code instructions specified in the DFG, and sending to the compute fabric multiple threads that each executes the code instructions specified in the DFG,
such that for a first DFG that is scheduled before a second DFG, at least some of the compute nodes and interconnects in the array are configured to execute the first DFG at a first time, and the same compute nodes and interconnects are then reconfigured to execute the second DFG at a second time, later than the first time.

19. The method according to claim 18, wherein scheduling the execution of the DFGs comprises selecting one of the following, to serve as a next DFG:

a DFG having a largest number of threads pending for execution;
a DFG having a smallest number of code instructions;
a DFG appearing next in a predefined order specified for the set of DFGs; and
the same DFG as a currently executed DFG.

20. The method according to claim 18, and comprising switching between the software program and at least another software program represented as another set of interconnected DFGs.

21. The method according to claim 18, wherein sending the threads comprises, for a given DFG being scheduled, sending the threads to the compute fabric to the compute fabric in successive batches, and comprising executing the threads of each batch by the compute fabric in a pipelined manner.

22. The method according to claim 21, wherein sending the threads comprises assigning a first compute node in the compute fabric to serve as an initiator node that receives the batches of the threads and initiates execution of the batches, and assigning a second compute node in the compute fabric to serve as a terminator node that terminates execution of the batches.

23. The method according to claim 21, and comprising saving a state of the software program upon completion of execution of a batch of threads.

24. The method according to claim 18, wherein configuring the compute nodes comprises, for a given DFG being scheduled, configuring multiple subsets of the compute nodes in the compute fabric to concurrently execute multiple respective replicas representing the same portion of the software program.

25. The method according to claim 18, wherein scheduling the execution of the DFGs comprises continually maintaining, at runtime, a table that specifies a respective next DFG for each of the multiple threads, and scheduling the execution of the threads in the DFGs based on the table.

26. The method according to claim 25, wherein maintaining the table comprises storing the table in a first memory, and caching a part of the table in a second memory having faster access than the first memory.

27. The method according to claim 18, and comprising storing the set of DFGs in a first memory, and caching a part of the set in a second memory having faster access than the first memory.

28. The method according to claim 27, wherein scheduling the execution of the DFGs comprises prefetching one or more of the DFGs from the first memory to the second memory.

29. The method according to claim 18, and comprising splitting the multiple threads into thread sets, and executing the thread sets one after another.

30. The method according to claim 18, wherein configuring the compute nodes comprises, for a given DFG being scheduled, deactivating at least part of a compute node that does not participate in executing the code instructions specified in the given DFG.

31. The method according to claim 18, wherein configuring the interconnects comprises, for a given DFG being scheduled, deactivating at least part of a switch that controls one or more interconnects, which do not participate in executing the code instructions specified in the given DFG.

32. The method according to claim 18, wherein configuring the compute nodes comprises, in a compute node in the compute fabric, switching-over from a currently-configured DFG to a next DFG in response to verifying that the compute node has completed processing all the threads associated with the currently-configured DFG.

33. The method according to claim 18, wherein configuring the compute nodes and the interconnects comprises configuring the compute fabric according to a next DFG, concurrently with execution of the code instructions according to a currently-configured DFG.

34. The method according to claim 18, wherein sending the threads comprises, when a next DFG is the same as a currently-configured DFG, sending one or more threads associated with the next DFG to the compute fabric, before the fabric has completed execution of the threads associated with the currently-configured DFG.

* * * * *